S. R. BOWIE.
Sled.
No. 52,663.
Patented Feb. 20, 1866.
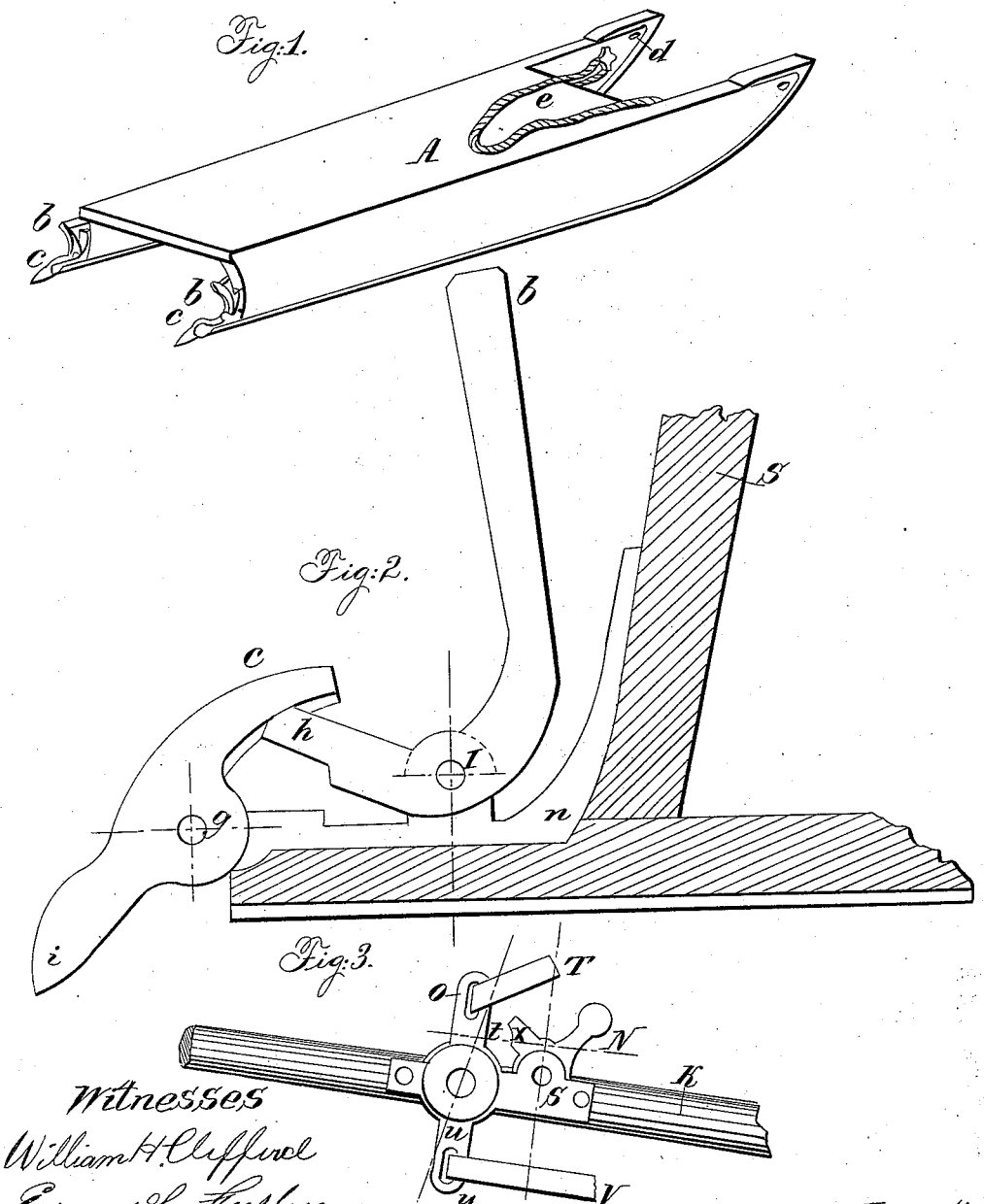
Witnesses
William H. Clifford
Edward S. Fulton
Inventor
Samuel R. Bowie

UNITED STATES PATENT OFFICE.

SAMUEL R. BOWIE, OF PORTLAND, MAINE.

IMPROVEMENT IN SLEDS.

Specification forming part of Letters Patent No. 52,663, dated February 20, 1866.

*To all whom it may concern:*

Be it known that I, SAMUEL R. BOWIE, of Portland, in the county of Cumberland and State of Maine, have invented a new and useful Improvement in Sleds and Sleighs; and I hereby declare the following to be a full, clear, and exact description thereof, which will enable others to make and use my invention, reference being made to the accompanying drawings, forming part of this specification, in which—

Figure 1 shows a sled with my improvement attached. Fig. 2 shows an enlarged view of that portion of my invention which is fastened to the rear end of a sled or sleigh runner; Fig. 3, a sleigh-shaft, with the method of operating my invention by means of the breeching-straps.

The object of my invention is to produce a device for steering or checking and stopping sleds and sleighs.

A, Fig. 1, is a sled, having the rope $e$, which passes through the pulleys $d$ and under the top of the sled, and fastened to the end of the lever $b$.

$b$, Fig. 2, shows, on an enlarged scale, the lever to which the rope is attached. This lever is bent, as shown in the figure, and turns upon the pivot $f$. The end $h$ is so made as to work under the end of the lever $c$, so that when the lever $b$ is, by the rope, drawn toward the stem $s$ of the sled the end $h$ turns the end $i$ of the lever $c$ downward, so that it presses upon the ground. When the force applied to the lever $b$ is withdrawn the motion of the sled forward will again restore the lever $c$ into a position nearly horizontal. By drawing the rope $e$ evenly on both sides the course of a sled can be checked or lessened at will. By drawing on one side at a time the course or direction is changed.

$n$ shows a bed or plate, to which the levers $b$ and $c$ are secured, and which is screwed to the runners of a sleigh or sled.

$k$, Fig. 3, represents a shaft with a device by means of which I contemplate the attachment of my invention to the breeching-straps of sleigh-harnesses.

T is the breeching-strap passing through the slot $o$ of the bar $u$, which is secured by and turns upon a pivot set into the shaft.

V shows a band passing through the slot $y$ in the other end of the bar, and which is connected with the lever $b$, Fig. 2.

N shows a lock or check turning on the pivot $s$, the end $x$ fitting into or against the lever $u$. When the end $x$ is brought into contact with the lever or bar $u$ the bar $u$ is held immovable when a strain is brought upon it by the breeching-strap. When the check N is drawn backward, as illustrated in the drawings, a strain upon the strap T inclines the bar as indicated by the red line. This draws the band V, moves the lever $b$, and presses the lever $c$ into or upon the ground or snow. Thus in the descent of a hill the strain upon the breeching-strap can be made to operate the device shown in Fig. 2 and relieve the weight of the vehicle, which would otherwise have to be sustained by the animal harnessed thereto.

What I claim as my invention, and desire to secure by Letters Patent, is—

1. The combination of the levers $b$ and $c$, the plate $n$, the rope $e$, and pulleys $d$, substantially as and for the purposes specified.

2. The combination of the parts $n$, $b$, and $c$ with the device shown in Fig. 3, substantially as described, and for the purposes set forth.

SAMUEL R. BOWIE.

Witnesses:
WILLIAM H. CLIFFORD,
EDWARD P. FURLONG.